United States Patent [19]

Thornton et al.

[11] 3,985,922

[45] Oct. 12, 1976

[54] PROCESS FOR WASHING PAINT OVERSPRAY FROM AIR

[75] Inventors: Robert H. Thornton, Bellevue; Bryce Chambers, Seattle, both of Wash.

[73] Assignee: InVireChem. Inc., Seattle, Wash.

[22] Filed: Aug. 12, 1971

[21] Appl. No.: 171,386

[52] U.S. Cl. ................... 427/345; 106/287 PR; 134/38; 252/180; 252/352; 252/546; 252/DIG. 8; 252/DIG. 11; 427/421; 427/445
[51] Int. Cl.² ..................... B05D 1/40; B05D 3/12
[58] Field of Search ...... 252/352, 546, 180, DIG. 8, 252/DIG. 11; 106/287 PR; 117/102 R; 427/421, 345; 134/38

[56] References Cited
UNITED STATES PATENTS

| | | | |
|---|---|---|---|
| 1,676,642 | 7/1928 | Fluegel | 252/140 |
| 2,544,649 | 3/1951 | Bersworth | 252/180 X |
| 2,741,599 | 4/1956 | McDonald et al. | 252/539 |
| 3,116,105 | 12/1963 | Kerst | 252/180 X |
| 3,308,065 | 3/1967 | Lesinski | 252/546 X |
| 3,660,297 | 5/1972 | McCammon | 117/102 R X |

*Primary Examiner*—Richard D. Lovering
*Attorney, Agent, or Firm*—Thomas W. Secrest

[57] ABSTRACT

Disclosed are compositions useful as deflocculants in recirculated aqueous systems utilized in the removal of paint sprays from air. These compositions comprise (a) a first component selected from water soluble salts of polyaminopolycarboxylic acids; water soluble salts of nitrilotriacetic acid; and mixtures thereof; (b) a second component selected from triethanolamine; water soluble salts of oxalic acid, tartaric acid, citric acid; gluconic acid and glucoheptonic acid; and mixtures thereof; and (c) a third component selected from sodium hydroxide, potassium hydroxide and mixtures thereof. Water systems containing small amounts of these compositions have a capacity of dissolving and dispersing large quantities of paint wastes.

6 Claims, No Drawings

PROCESS FOR WASHING PAINT OVERSPRAY FROM AIR

BACKGROUND OF THE INVENTION

This invention relates to the control of oversprays from paint spray booths and more particularly to deflocculating compositions useful in the recirculated water systems utilized in the washing of oversprays of paint and other coatings from air.

To contain the overspray from paint spray booths, the painting area is typically surrounded by water curtains created by overhead nozzles. For economic reasons, the water is recirculated until it is saturated with paint wastes. The use of pure water is unsatisfactory because of its limited capacity for maintaining paint wastes in dissolved or suspended states. The wastes therefore rapidly saturate the water and then separate therefrom as a very troublesome sludge. Furthermore, chemical and physical interactions between the paint constituents and the water create voluminous foams which reduce the efficiency of the water curtains and often cause the recirculation system to overflow.

To increase the paint-holding capacity of curtain waters, sodium hydroxide is typically added as an aid in decomposing the resin systems typically used as vehicles for the paint pigments. The beneficial effects of using caustic alone are minimal and the formation of sludge and foam are generally not avoided.

It is also known to use combinations of ingredients for enhancing the paint-holding capacity of curtain waters. One such combination of ingredients includes sodium gluconate, sodium bitantrate, triethanolamine, sodium hydroxide and a wetting agent.

It is an object of this invention to provide deflocculant compositions which, when added to air-wash systems, will effect digestion, dissolution and/or suspension of paints and other coatings to a degree not heretofore obtainable. It is a further object to provide defloc culant compositions of the type described which, when added to such systems, will prevent or reduce the formation of foams, inhibit the corrosion of steel, reduce the toxicity of paint-saturated waters and reduce or prevent the growth of slime-producing micro-organisms.

SUMMARY OF THE INVENTION

This invention is directed to compositions for increasing the paint-holding capacity of waters. These compositions comprise: (a) a first component selected from water soluble salts of polyaminopolycarboxylic acids; water soluble salts of nitrilotriacetic acid and mixtures thereof; (b) a second component selected from triethanolamine; water soluble salts of oxalic acid, tartaric acid, citric acid; gluconic acid and glucoheptonic acid; and mixtures thereof; and (c) a third component selected from sodium hydroxide, potassium hydroxide and mixtures thereof. Exemplary of the water soluble salts of polyaminopolycarboxylic acids useful in this invention are ethylenediaminetetraacetic acid, hydroxyethylethylenediaminetriacetic acid and diethylenetriamine pentaacetic acid. Alkali metal salts of these acids, and especially the sodium salts of ethylenediaminetetraacetic, i.e., the disodium and tetrasodium salts, are preferred for use as the first component.

The second component is preferably comprised of a mixture of triethanolamine and at least one alkali metal salt of oxalic acid, tartaric acid, citric acid, gluconic acid and glucoheptonic acid. Most preferably, the second component comprises a mixture of triethanolamine and an alkali metal salt of gluconic and/or tartaric acid.

This invention is also directed to a process for washing an overspray of paint or other industrial coating from air comprising contacting the spray with a dilute aqueous solution of one of the deflocculant compositions of this invention.

This invention is further directed to compositions comprising paint wastes dispersed in a dilute aqueous solution of a deflocculant composition of this invention.

DETAILED DESCRIPTION OF THE INVENTION

One feature of the deflocculant compositions of this invention which distinguishes them from similar prior art deflocculant compositions is that they contain one or more water soluble salts of polyaminopolycarboxylic acids and/or nitrilotriacetic acid. It has been found that these salts are particularly effective in forming complexes with a broad range of paint pigments, thereby effecting suspension of the pigments. These salts are also very effective in breaking down or otherwise dissolving organic resin vehicles in paints to form solutions or colloidal suspensions thereof. These salts of polyaminopolycarboxylic acids, however, are relatively ineffective for a few important metal salts which must usually be contended with, notably iron oxide which is often used as a paint pigment and which is usually present as rust in spray booth equipment in which the compositions of this invention have not been utilized. It is therefore preferred to utilize other complexing agents in combination with the salts of polyaminopolycarboxylic acids in order to render the compositions of this invention effective with respect to a broader range of commercial paint pigments. Sodium gluconate effectively complexes with iron and is more effective for a few other metals such as aluminum than are the salts of polyaminopolycarboxylic acids. Sodium gluconate is also particularly effective in attacking the resin vehicles in many paints.

Triethanolamine is effective for complexing iron and overlaps with sodium gluconate in this regard. Triethanolamine is also of additional value in that it amplifies the complexing capability of the polyaminopolycarboxylic acid salts. Because of this synergistic effect of triethanolamine and the complexing capability of gluconates, the compositions of this invention preferably contain these two materials in combination with one of the polyaminopolycarboxylic acid salts.

The potassium, sodium and ammonium forms of the complexing agents used in the compositions of this invention can be used alternatively with substantially equivalent results. The free acids can also be used since they are converted in situ to the corresponding water soluble salts by reaction with the sodium and/or potassium hydroxide present in the deflocculant compositions. Complexing agents in the form of salts of calcium, copper, iron, magnesium and manganese can also be used, but these forms are less effective than those referred to previously.

When added in small concentrations to air-wash systems, the deflocculants serve to digest, dissolve and/or suspend organic vehicle reaction products and paint pigments to a degree not heretofore possible. Pigments are generally reduced to particle sizes approximating those in their originally compounded states. Measurements of pigment particles dispersed in deflocculating solutions according to this invention show the range of particle sizes to be from about 5 to 30 microns.

The deflocculants of this invention elevate the amount of reacted organic residues which can be held in solution or as a colloidal suspension. For instance, the average recommended operating range for total dissolved solids using the compositions of this invention is from 50,000 to 80,000 ppm. However, systems utilizing compositions of this invention have in some instances operated for extended periods at solid concentrations exceeding 150,000 ppm. Stated otherwise, these systems operated effectively at 15 percent by weight total solids. Experiments have shown that with most other deflocculating systems, dissolved solids seldom exceed 12,000 ppm.

Many paint wastes are effectively dispersed by dilute aqueous compositions of this invention in which the first and second components are present at concentrations as low as 0.004% and 0.006% by weight, respectively, and the third component is present in an amount sufficient to produce a pH of at least 10. Preferably, however, the first and second components are each present at concentrations of about 0.01% to 0.03% by weight and the amount of third component is sufficient to produce a pH of at least 11. The fact that the compositions effectively disperse paint waste at such low concentrations is a decided advantage over similar prior art deflocculants.

Although the compositions of this invention are not designed to dissolve heavy metals which would then constitute toxic contaminants in plant effluents, should a metallic fraction ionize and enter the deflocculating solution, it immediately reacts with the complexing agents to form a metal complex. This comparatively unreactive metal form is known to be only a fraction as toxic as the ion in its free reactive state. Thus, when the curtain waters are finally saturated with paint to a point of ineffectiveness the disposal problem is substantially simplified by virtue of the reduced toxicity of the materials contained in the water. The waste waters can frequently be discharged directly into public sewers or waterways, or at least with much less dilution of pure water than would be required for more toxic wastes.

The compositions of this invention greatly extend the intervals between spray booth cleaning while at the same time maintaining clean circulating lines, headers and spray nozzles. All areas washed with deflocculating solutions of this invention are influenced by a long-lived corrosion inhibitive mechanism, corrosion rates usually being limited to less than 10 mils per year. Spray booths can be shut down for periods of one month and more without recurrence of active corrosion. Areas above spray headers are protected from corrosion by the vapor phase inhibitors intrinsic to the compositions of this invention. These inhibitors additionally act to penetrate beneath and remove from eliminator baffles and interior stack surfaces deposits which have been deposited prior to use of the deflocculants of this invention. The minute size of pigment particles suspended within the deflocculating solutions of this invention reduces abrasion within the water systems and results in extended equipment life.

Reactions of paint wastes with ingredients in the deflocculant compositions of this invention are of such a nature and efficiency that utilization of the resultant reaction products by micro-organisms as energy sources is essentially prevented. Thus, odors, slimes and acid reactions often caused by bacteria within the deflocculating solutions is greatly reduced or eliminated entirely.

The deflocculants of this invention are preferably prepared as concentrated aqueous solutions, or as free-flowing, water soluble solids which can be added in small amounts to air-wash systems. The following examples describe several such concentrates and the use thereof in the water systems of paint spray booths. All parts and percentages are by weight unless otherwise indicated.

EXAMPLE 1

A concentrated aqueous solution of the following ingredients was prepared:

|  | Percent |
| --- | --- |
| Triethanolamine (TEA) | 5.2 |
| Sodium gluconate | 9.5 |
| Tetrasodium ethylenediaminetetraacetate (Na$_4$EDTA) | 7.8 |
| Sodium hydroxide (NaOH) | 12.0 |
| Water | 65.5 |

This concentrate was added to the curtain waters used in a paint spray booth to produce a final concentration of 0.22 to 0.33 volume percent, i.e., 300 to 450 volumes of water to one volume of concentrate, and an initial pH of 11.7 to 11.9.

Several methods can be utilized to replenish defloc-culant constituents consumed during operation of the spray booth. One method is to add more concentrate to the curtain water at a rate sufficient to maintain the pH between about 11 and 12.8. Another method is to determine the residual, uncomplexed Na$_4$EDTA and replace the consumed portion with an appropriate amount of concentrate. Na$_4$EDTA is normally consumed at a higher rate than the other complexing agents and the latter tend to accumulate in slight excess. Determination of the uncomplexed Na$_4$EDTA can be accomplished by available analytical techniques, e.g., using dyes responsive to an excess of complexing agents or indicators responsive to an excess of a particular metal salt. Another method of replenishing the curtain waters merely involves the addition of defloc-culant concentrate at a fixed rate which, as determined by experience, will maintain the curtain waters of the particular spray booth free of sludge and foam for an extended period of time.

Although the concentrate of this Example performed well, it was found that the sodium hydroxide concentration was somewhat lower than optimum. Due to reaction of the sodium hydroxide with the paint constituents and with carbon dioxide present in the curtain waters, the pH of the waters dropped too rapidly during booth operation. The concentration of the complexing agents was higher than necessary and tended to increase to a substantial excess during replenishment of the curtain waters. The high concentration of complexing agents also resulted in the occurrence of some crystallization in the concentrate during storage.

EXAMPLE 2

A liquid concentrate of the following composition was prepared:

|  | Percent |
|---|---|
| TEA | 1.62 |
| Sodium gluconate | 5.65 |
| Potassium bitartrate | 3.23 |
| Na₄EDTA | 4.03 |
| Sodium hydroxide | 24.00 |
| Triton DF-12 (surfactant) | 0.10 |
| Water | 61.37 |

This concentrate was added to the curtain waters of a paint spray booth at a rate of 1 part concentrate per 300 parts water. The concentration of TEA, sodium gluconate, potassium bitartarate and Na₄EDTA were thus 0.007%, 0.014%, 0.025% and 0.018%, respectively. Triton DF-12 is a low foaming surfactant produced by Rohm and Haas Company and designated as a modified polyethoxylated straight chain alcohol. The potassium bitartrate was included in the above composition in order to increase the scope of complexing power and paint dispersal. The surfactant addition was found to increase the paint dispersal or dissolving capacity of the composition without causing foam problems. The increased sodium hydroxide concentration and more moderate concentration of complexing agents resulted in less rapid decrease in pH during paint booth operation and reduced the tendency for the complexing agents to build to excess as additional concentrate was added to maintain the pH. The gluconate and bitartrate, however, do tend to build up somewhat, while the Na₄EDTA concentration remains constant or builds up only moderately. The concentrate of this Example also showed less tendency to crytallize during storage than does the concentrate of Example 1.

EXAMPLE 3

The following concentrate has shown excellent storage stability and effectiveness in spray booth curtain waters:

|  | Percent |
|---|---|
| TEA | 1.57 |
| Sodium gluconate | 3.13 |
| Potassium bitartrate | 1.57 |
| Na₄EDTA | 3.90 |
| NaOH | 24.00 |
| KOH | 6.00 |
| Triton DF-12 | 0.10 |
| Water | 59.73 |

Because potassium hydroxide is more soluble than sodium hydroxide, the causticity of the concentrate is increased in comparison with the composition of preceding examples. The diminished concentration of complexing agents reduces the tendency for ingredients in the concentrate to crystallize without detracting from the effectiveness of the composition.

EXAMPLE 4

A free-flowing mixture of the following ingredients was prepared;

|  | Percent |
|---|---|
| NaOH | 67.0 |
| Sodium gluconate | 9.0 |
| Na₄EDTA | 9.0 |
| TEA | 2.0 |
| Triton DF-12 | 11.0 |
| Tributyl phosphate | 2.0 |

The tributyl phosphate serves as a foam suppressant. The mixture can be charged into a spray booth water system at a rate of 0.3 ounce per gallon of water. Replenishment is made as necessary to maintain the pH at from 11.5 to 12.8.

What is claimed is:

1. A process for washing paint overspray from air comprising contacting said overspray with an aqueous solution comprising at least 0.004% by weight of a first component selected from the group consisting of water soluble salts of polyaminopolycarboxylic acids, water soluble salts of nitrilotriacetic acid, and mixtures thereof; a second component selected from the group consisting of sodium hydroxide, potassium hydroxide and mixtures thereof, the amount of said second component being such that said solution has a pH of at least 10; and at least 0.006% by weight of a third component selected from the group consisting of triethanolamine, water soluble salts of oxalic acid, tartaric acid, citric acid, gluconic acid and glucoheptonic acid, and mixtures thereof; whereby said overspray becomes entrained in said solution and dispersed therein.

2. The process of claim 1 wherein said solution is comprised of at least 0.01% by weight of said third component.

3. The process of claim 2 wherein said third component consists of triethanolamine and at least one compound selected from the group consisting of alkali metal salts of oxalic acid, tartaric acid, citric acid, gluconic acid and glucoheptonic acid.

4. The process of claim 3 wherein said solution is comprised of at least 0.01% by weight of said third component.

5. A process for washing paint overspray from air comprising contacting said overspray with an aqueous solution comprising at least 0.01% by weight of a first component selected from the group consisting of water soluble salts of ethylenediaminetetraacetic acid, hydroxyethylethylenediaminetriacetic acid, nitrilotriacetic acid, diethylenetriamine pentaacetic acid and mixtures thereof; a second component selected from the group consisting of sodium hydroxide, potassium hydroxide and mixtures thereof, the amount of said second component being such that said solution has a pH of at least 11; and at least 0.01% by weight of a third component consisting of a mixture of triethanolamine and at least one compound selected from the group consisting of water soluble salts of oxalic acid, tartaric acid, citric acid, gluconic acid and glucoheptonic acid, whereby the overspray becomes entrained in said solution and dispersed therein.

6. The process of claim 5 wherein said third component consists of a mixture of triethanolamine and a water soluble salt of gluconic acid.

* * * * *